United States Patent [19]
Foster et al.

[11] 3,879,612
[45] Apr. 22, 1975

[54] MULTI-SENSOR RADIATION DETECTOR SYSTEM

[75] Inventors: Robert Gilmer Foster, Granby, Conn.; Richard David Cyboron, Feeding Hills, Mass.

[73] Assignee: Combustion Engineering, Inc., Windsor, Conn.

[22] Filed: Aug. 24, 1973

[21] Appl. No.: 391,441

[52] U.S. Cl. ............... 250/370; 250/252; 250/385; 250/390
[51] Int. Cl. .............................................. G01t 3/00
[58] Field of Search ........... 250/390, 370, 252, 385; 176/26, 24, 15

[56] References Cited
UNITED STATES PATENTS
| | | | |
|---|---|---|---|
| 2,976,418 | 3/1961 | Johnson | 250/390 |
| 3,760,183 | 9/1973 | Neissel | 250/390 |

*Primary Examiner*—Harold A. Dixon
*Attorney, Agent, or Firm*—Stephen A. Schneeberger

[57] ABSTRACT

The invention is a multi-sensor radiation detection system including a self-powered detector and an ion or fission chamber, preferably joined as a unitary structure, for removable insertion into a nuclear reactor. The detector and chamber are connected electrically in parallel, requiring but two conductors extending out of the reactor to external electrical circuitry which includes a load impedance, a voltage source, and switch means. The switch means are employed to alternately connect the detector and chamber either with the load impedance or with the load impedance and the voltage source. In the former orientation, current through the load impedance indicates flux intensity at the self-powered detector and in the latter orientation, the current indicates flux intensity at the detector and fission chamber, though almost all of the current is contributed by the fission chamber.

8 Claims, 3 Drawing Figures

PATENTED APR 22 1975

MULTI-SENSOR RADIATION DETECTOR SYSTEM

BACKGROUND OF THE DISCLOSURE

The invention relates generally to a radiation detector and more particularly to a multi-sensor radiation detector system. More particularly still, the invention relates to a detector including diverse types of radiation sensors and the electrical circuitry associated therewith.

In nuclear reactors it is common to utilize in-core instrumentation to perform various analytical and monitoring functions within the core region of the reactor. One major such function is the monitoring of neutron flux. Typically, several radiation sensors, such as ion chambers, self-powered neutron detectors and the like, are housed within a thimble or guide tybe which extends the length of the core. Electrical leads are connected with the sensors and pass through the reactor vessel wall, in a known manner, to measuring circuitry.

It may be desirable, in addition to the normally fixed in-core instrumentation, to have a movable instrumentation package. Such movable instrumentation is adapted to be inserted into and withdrawn from the core in a known manner during operation of the reactor. The movable instrumentation may be utilized to calibrate the fixed in-core detectors from time to time and to improve axial resolution of the local neutron flux distribution.

In some reactors, self-powered neutron detectors are employed as the fixed or stationary neutron sensors. Such detectors may be less sensitive than ion and fission chambers, but have a life span that is several times that of ion detectors and is generally greater than the refueling cycle length. In order to calibrate such self-powered detectors, it is preferable to use similar self-powered detectors in the movable instrumentation; however, an ion or preferably fission chamber, which has greater sensitivity than a self-powered detector is preferred for sensing local flux peaks because of the need to keep its short active axial length which enhances the axial resolution.

While the two different types of sensors might be inserted into and withdrawn from the reactor core at different times, this complicates the operation and doubles the number of times the reactor must be penetrated. On the other hand, both types of sensors might be included as part of a single instrumentation package. However this latter arrangement poses difficulties due to the fact that the movable instrumentation package including its electrical leads must be quite small in diameter in order to insure its trouble-free insertion and withdrawl. The movable instrumentation is generally inserted within a small tube (0.140 inch I.D.) housed within the guide structure along with the fixed in-core instruments. While the individual sensors of the movable package may be of sufficiently small diameter to be readily accommodated in the small tube, the several electrical leads normally required for two or more independent detectors may not be conveniently housed within the small tube, due to their size and number.

SUMMARY OF THE INVENTION

According to the invention there is provided a multi-sensor radiation detector system comprising a first sensor of the ion chamber type for establishing a current flow in a circuit flow when a potential is applied thereat simultaneous with neutron flux incidence with the sensor, said current being indicative of the intensity of said incident flux; a second sensor of the self-powered type for establishing a current flow in a circuit simultaneous with neutron flux incidence with the sensor, said current being indicative of the intensity of said incident flux; a single conductor pair connecting the first and second sensors electrically in parallel; a load impedance, a voltage source connected to the load impedance; and means, such as a switch, for selectively connecting the conductor pair having the paralleled sensors to the load impedance or alternately, to the load impedance and additionally the voltage source, whereby current through the load impedance is indicative of the intensity of neutron flux incident with the second sensor when both sensors are connected to the load impedance and the voltage source is omitted and is indicative of the intensity of neutron flux incident with both the first and second sensors when the voltage source is additionally connected thereto. However the total current will also be substantially indicative of the intensity of neutron flux incident with only the first sensor in the latter arrangement of the voltage source.

This arrangement permits a pair of small diameter sensors, one requiring a voltage source and the other not, to be connected in a single, common circuit, thus minimizing the number of electrical leads required. Preferably, a small diameter coaxial cable having a single center conductor and a single outer conductor is used. The detector system so constructed may easily be inserted into and removed from the reactor core during operation to perform the necessary measuring and calibrating functions.

The current generated by the self-powered detector is considerably less than that of the ion chamber when exposed to the same neutron flux, such that when both are operating concurrently, the current through the load impedance is almost entirely from the ion chamber and is therefore substantially indicative of the intensity of the radiation to which the ion chamber is exposed.

DESCRIPTION OF THE PREFERRED EMBODIMENT

Figure 1:
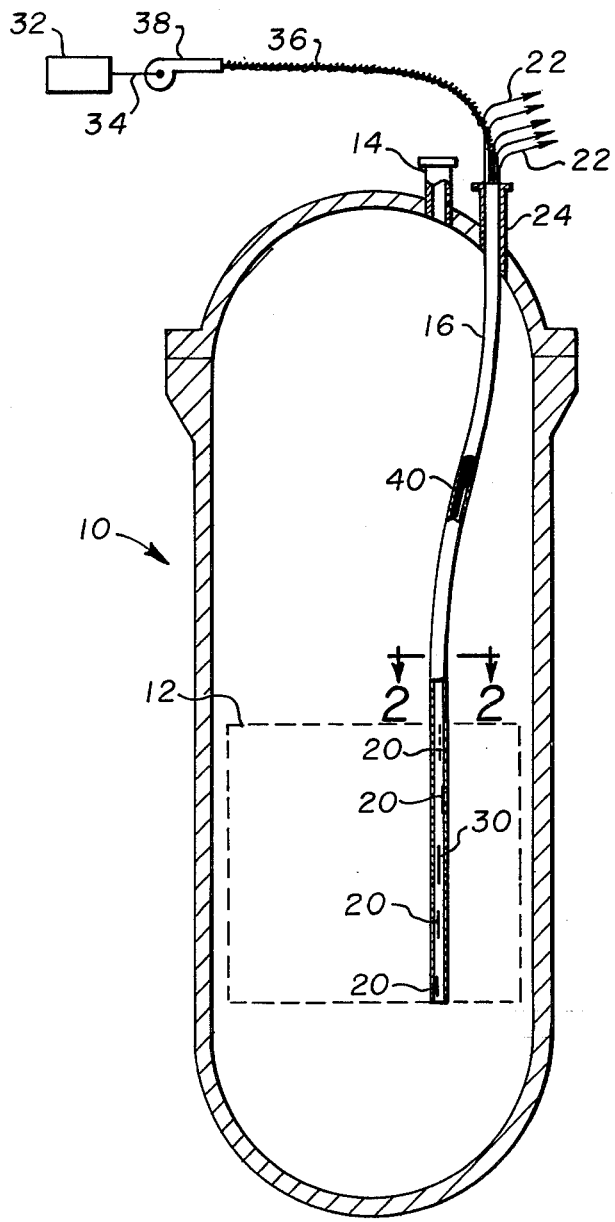
FIG. 1 is a somewhat diagrammatical view of a nuclear reactor showing the detector system of the invention in use therein.
Figure 2:
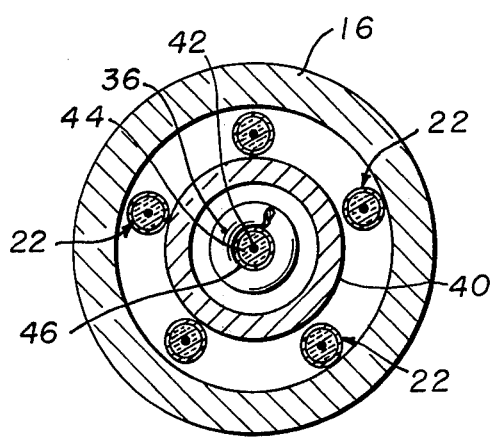
FIG. 2 is a sectional view along lines 2—2 of FIG. 1.

Referring to FIG. 1 there is depicted, in a somewhat diagrammatical form, a nuclear reactor 10 having a core region 12 in which the fission process results in particular levels of neutron flux. The flux levels are generally controlled by control rods reversibly insertable into core 12 through control rod nozzles 14, only one of which is shown.

Instrumentation for monitoring the flux level may be fixedly positioned within a tube-like instrument thimble 16 which extendss downwardly, generally through, the core 12 from an instrument nozzle 24. Thimble 16 is sealed at nozzle 24 to generally isolate its interior from the reactor interior. The thimble 16 may be positioned in a guide tube, not shown, in the core 12. Generally, the reactor 10 will contain many instrument thimbles 16 which in turn house the in-core instrumentation and electrical leads, however only one such thimble is shown here for simplicity.

Typically, a thimble 16 may house five vertically extending selfpowered neutron detectors 20, each of which is somewhat over a foot in length and occupies a different axial positioning than the others. Detectors 20 monitor the neutron flux intensity in their local regions. Electrical leads, here generally designated 22, extend from the individual detectors 20 upwardly through thimble 16 and out of the reactor 10 through instrument nozzle 24. The reactor will generally have several nozzles 24, only one being shown here. Also, the nozzle 24 and thimble 16 may either be axially aligned or they may be offset as shown, requiring a certain degree of flexibility in the electrical leads which extend between the nozzle and the core 12 location of the thimble. In addition, each nozzle will generally contain several thimbles 16, only one being shown here. An additional seal, through which the leads 22 exit, may also generally isolate the interior of thimble 16 from the region exterior to the reactor. Leads 22 from detectors 20 are connected to appropriate readout means, not shown.

In addition to the aforedescribed instrumentation for permanent installation in core 12, instrumentation is provided of a type which may be selectively inserted into and withdrawn from the core during operation of reactor 10. This instrumentation is used both to calibrate the fixedly position instrumentation and to precisely locate regions of flux excursions. It includes two neutron flux sensors, both a self-powered detector 26, similar to detectors 20 and an ion or, more specifically, fission chamber 28, seen in FIG. 3. A fission chamber is preferably used because of its superior lifetime when exposed to neutron flux as compared with a non-fissionable lined ion chamber. Both detector 26 and chamber 28 are types well known in the prior art. Self-powered detector 26, like detectors 20, is of a type which does not require application of a gathering potential to the operating electrodes in order to develop a current resulting from neutron impingement on the detector. This phenomenon is descriped more thoroughly in U.S. Pat. No. 3,375,370 to J. W. Hilborn, entitled SELF-POWERED NEUTRON DETECTOR.

In the preferred embodiment of the invention, both self-powered detector 26 and fission chamber 28 are combined as an integral unit, to form radiation detector probe 30. Probe 30 is connected electrically with read-out circuitry 32 through a long, electrically conductive coaxial lead cable 34. Coaxial cable 34 is in turn housed within a ridged hollow drive cable 36 extending much of its length. Hollow cable 36 may be a conduit formed by a spirally or helically, closely wound metal wire or cable. A drive mechanism of well known design and generally represented by drive motor 38, drivingly engages the ridges of drive cable 36 to propel it longitudinally. The coaxial cable 34 is snugly housed in drive cable 36 and is essentially non-movable longitudinally thereof. The probe 30 extends beyond one end of drive cable 36, with the coaxial cable 34 extending beyond its other end and beyond motor 38 to the read-out circuitry 32.

Probe 38 is reciprocably insertable into the removable from a small diameter tube 40 which is permanently positioned within an instrument thimble 16, concentric therewith. Tube 40 may be closed at its lower end, which is near the lower end of the thimble at the bottom of core 12. The upper end of tube 40 extends through the seals which isolate the interior of thimble 16 from the environment external to reactor 10, thus exposing the interior of the tube to that environment for receiving movable probe 38.

Tube 40 and cables 34 and 36 must be somewhat flexible to accommodate any bends or offsets in thimble 16. Typically, tube 40 must be small in diameter to be housed within thimble 16 along with the several detectors 20 and their electrical leads 22 and it may have an internal diameter of about 0.140 inch. The outside diameter of the drive cable 36 which encircles coaxial cable 34 is typically about 0.12 inch, with the internal diameter being less than one-half that dimension in order to give sufficient thickness to the cable walls for them to be ridged and somewhat rigid. This leaves little room within cable 36 for coaxial cable 34, which typically has an outside diameter of about 0.032–0.040 inch.

Coaxial cable 34 may typically comprise an Inconel center conductor 42, surrounded by a thermally and radiationally durable insulating medium such as magnesium or aluminum oxide 44, in turn surrounded by a conductive Inconel sheath 46.

Figure 3:
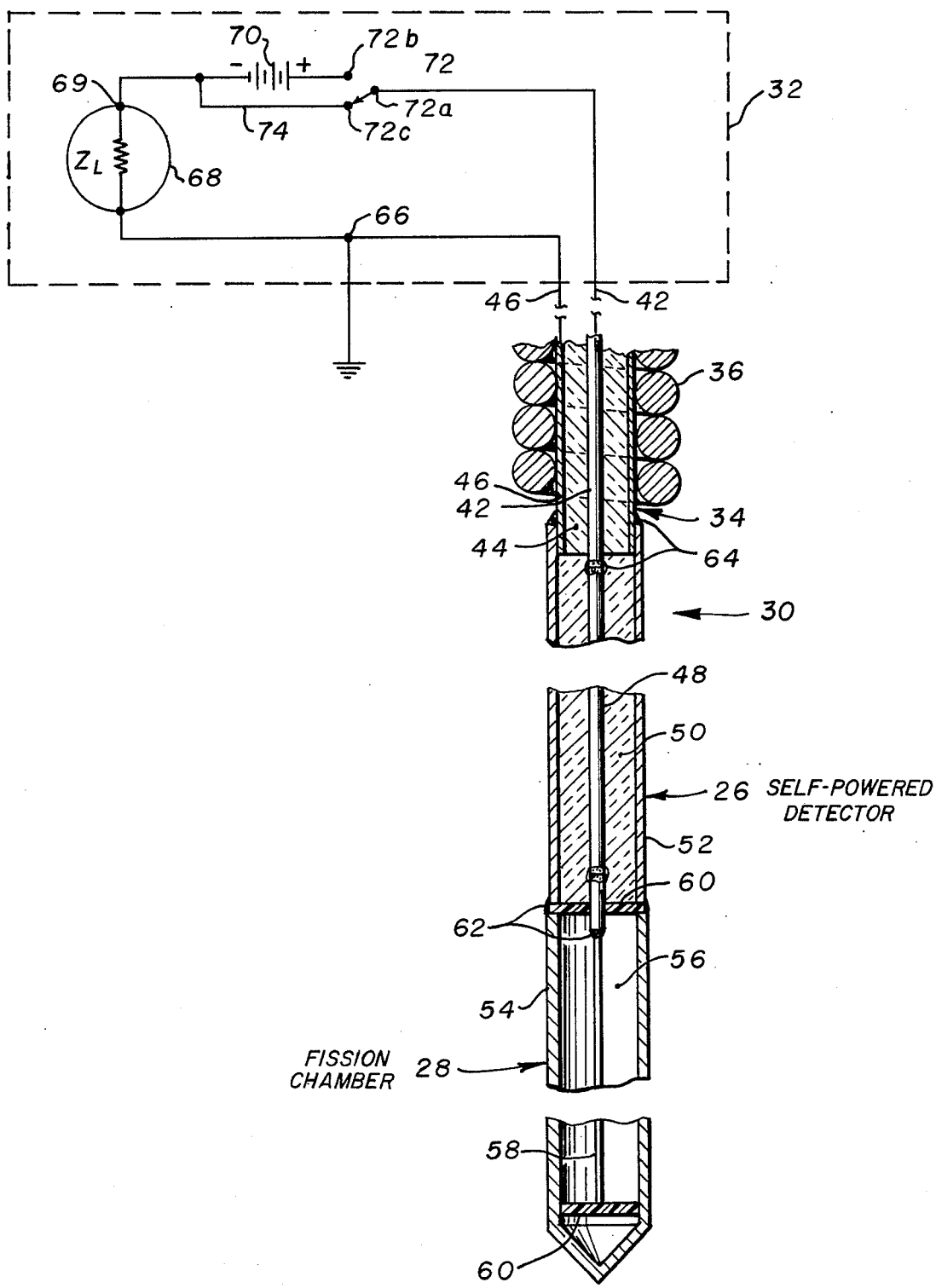
FIG. 3 is a schematic cross section illustrating the sensors and circuitry of the detector system of the invention.

As depicted in FIG. 3, it will be noted that self-powered detector 26 and fission chamber 28 may be joined to form the unitary structure of probe 30. Self-powered detector 26 comprises a central emitter electrode 48, an insulating medium 50 surrounding the emitter 48, and an outer cylindrical collector electrode 52 surrounding insulator 50. Emitter 48 is of a material which readily emits energetic electrons when exposed to and bombarded by thermal neutrons, as for instance rhodium or vanadium. Insulating medium 50 may be of the same type as that of coaxial cable 34, magnesium or aluminum oxide. Collector electrode 52 might be a tubular section of Inconel. Detector 26 may be about 1 foot in length.

Fission chamber 28 comprises a cylinder 54 which serves as cathode, the inner surface of which is coated with a fissionable material; a gas such as helium occupies the interior region 56 of cylinder 54; a rod-like center conductor 58 serves as an anode and a pair of disk-like insulators 60 support and space the anode 58 from the cathode 54 and sealingly close the ends of region 56 to retain the gas therewithin. Anode 58 and cathode 54 may be of metal such as Inconel or stainless steel. Insulators 60 may be of a durable heat resistant ceramic. Fission chamber 28 may have an overall length of about two inches, with about half of that being the active length of the chamber.

Chamber 28 and detector 26 are joined in coaxially aligned end-to-end relationship by weld or braze connections 62 which rigidly and electrically connect collector 52 with cathode 54 and which rigidly and electrically connect emitter 48 with anode 58. Further, the other end of detector 26 is connected to the end of coaxial cable 34 by weld or braze connections 64 which rigidly and electrically connect collector 52 with sheath 46 and which rigidly and electrically connect emitter 48 with center conductor 52. It will be appreciated that detector 26 might be formed simply be replacing part of the center conductor of coaxial cable 34 with a length of emitter material such as rhodium.

Referring now to the electrical circuitry of FIG. 3, and particularly to the read-out circuitry 32, it will be noted that detector 26 and fission chamber 28 are connected electrically in parallel. Emitter 42 and anode 58 are electrically connected together to coax center conductor 42, and collector 52 and cathode 54 are electrically connected together to coax sheath conductor 46. coax conductor 46 might be connected electrically to ground, as at ground terminal 66. One side, or terminal, of a current measuring device 68 is also connected directly to conductor 46 and ground terminal 66.

The center conductor 42 of the coaxial cable 34 is connected to the other side, or terminal of current measuring device 68, either directly or in series with a source 70 of DC potential. Source 70 may be a battery or the like having a voltage of 100–300 volts and its negative terminal connected to terminal 69 of current measuring device 68, remote from terminal 66, and its positive terminal connected to terminal 72b of single pole, double throw switch 72. Terminal 72c of switch 72 is connected electrically as by conductor 74, to a point electrically in common with the negative terminal of source 70, effectively bypassing the voltage source. Center conductor 42 of coaxial cable 34 is connected to terminal 72a about which the contact of switch 72 pivots. The contact of switch 72 is operative to close an electrical circuit either between terminals 72a and 72b or between terminals 72a and 72c. When the contact closes the circuit with terminal 72b, voltage source 70 is connected in series between the load impedance 70 and the sensors of probe 30. Alternately, when the switch contact closes the circuit with terminal 72c, voltage source 70 is bypassed and thereis no external source of voltage for probe 70 in the circuit.

It will be appreciated that terminal 72a of switch 72 might be connected directly to terminal 69 of current measuring device 68 and that the positive terminal of voltage source 70 and the conductor 74 might be connected directly, in parallel, to center conductor 42, with switch terminals 72b and 72c at the other ends thereof respectively, resulting in a circuit which performs electrically in the same manner as the arrangement previously described and depicted.

The impedance of current measuring device 68 may be a low value of resistance, for instance 100 ohms. Current measuring device 68 might conveniently be an ammeter or the like through which a current to be measured is passed. The impedance of meter 68 is held to a low value to keep any voltage drop across it to a relatively low value for a reason to be explained hreinafter. It is appreciated that one way to effect said low value of load impedance 68 is to utilize the input of a high gain DC operational amplifier.

Fission chamber 28 typically requries the application of an external potential above some minimum threshold value which may be 25–50 volts, as from voltage source 70, between anode 58 and cathode 54 in order to provide ion and electron gathering fields at these electrodes. For potentials below the threshold value, resulting currents are minimal and not reliably indicative of flux intensity. When such potential is applied and the chamber 28 is subjected to incident neutron flux, an electrical current results from ionization of the gas in the chamber. This current is generally porportional to, thus indicative of, the intensity of the neutron flux incident on or with the chamber 28 and is measured by ammeter or current measuring device 68 connected in series therewith.

On the other hand, self-powered detector 26, as earlier explained, does not require the application of an external potential such as source 70 to obtain a resulting current flow due to incidence of neutron flux on or with the detector. Rather, neutrons bombarding emitter 48 produce energetic electrons which are emitted therefrom, pass through insulator 50, and are collected at collector 52, resulting in a current flow which is measurable by ammeter 68 in the external circuit. The resulting current is generally proportional to and thus indicative of, the intensity of neutron flux incident with the detector 26.

It thus becomes evident that when switch 72 is actuated, manually otherwise, to close the circuit between terminals 72a and 72c, voltage source 70 is omitted from the circuit and only self-powered detector 26 of probe 30 should be responsible for the current measured through the load impedance of ammeter 68. As earlier noted, the resistance of ammeter 68 is held to a low value. This is done in order to prevent the current resulting from detector 26 and passing through the ammeter 68 from creating a voltage drop across the meter of sufficient magnitude to replace, or partially replace, the omitted source 68 and thus "enable" fission chamber 28. Therefore, the current through ammeter 68 will be indicative only of the intensity of neutron flux sensed by detector 26.

When switch 72 is actuated to close the circuit between terminals 72a and 72b, voltage source 70 is included in the circuit, thus enabling fission chamber 28. It would appear now that both chamber 28 and detector 30 contribute to the current passing through ammeter 68. In fact this may be the case, however that portion of the current contributed by detector 26 may be small, for instance less than 2 percent of the total at any particular level or intensity of neutron flux incident with the probe 30. Therefore, the current flowing in the circuit and measured by ammeter 68 results almost entirely from neutron incidence with fission chamber 28 and accordingly, is itself substantially indicative of the intensity of neutron flux incident with the chamber. In any case, current from the fission chamber 28 can be determined exactly by subtracting the current measured when the fission chamber is "disabled" from that current measured when the fission chamber is enabled.

Thus there has been described a probe 30 comprising detector 26 and fission chamber 28 connected to a remote read-out circuit 32 by but two electrical conductors. This arrangement permits the connecting conductor package, such as coaxial cable 34, to be of relatively small diameter, such that it may fit inside drive cable 38 which in turn is removably insertable into the region of reactor core 12 during operation of reactor 10.

It will be understood that the embodiment shown and described herein is merely illustrative and that changes may be made without departing from the scope of the invention as claimed.

What is claimed is:

1. A multi-sensor radiation detector system comprising:
   a. a first sensor of the ion chamber type including a pair of spaced electrodes for connection to a source of voltage, and electrical current being established between said electrodes when said voltage is applied thereacross and neutron flux is incident on said sensor, said current being indicative of the intensity of said incident neutron flux;

b. a second sensor of the self-powered type including a pair of spaced electrodes and insulating means extending therebetween, an electrical current being established between said electrodes when neutron flux is incident on said second sensor, said current being indicative of the intensity of said incident neutron flux;

c. conductor means directly connecting said first and second sensors electrically in parallel;

d. a load impedance;

e. voltage source means; and f. means for selectively connecting said conductor means including said first and second sensors alternately to said load impedance or to said load impedance and additionally said voltage source means, whereby current through said load impedance is indicative of the intensity of neutron flux incident with said second sensor when said first and second sensors are connected to said load impedance absent said voltage source and is indicative of the intensity of neutron flux incident with both said first and second sensors when said voltage source is additionally connected thereto.

2. The apparatus of claim 1 wherein said current through said load impedance when said voltage source is connected to said first and second sensors in substantially indicative of the intensity of neutron flux incident with only said first sensor.

3. The apparatus of claim 1 wherein said first sensor is operative to provide said indication of intensity of neutron flux incident therewtih only when said voltage exceeds a minimum threshold value, said voltage source means exceeding said threshold vlaue; and the vlaue of said load impedance is less than that at which current from said second sensor would create a voltage drop across said impedance means equal to or greater than said threshold value.

4. The apparatus of claim 1 wherein said voltage source means is connected in series with said load impedance means; as bypass connection occurs intermediate said load impedance means and said voltage source means; and said selective connecting means include a switch for connecting said circuit including said sensors alternately to said bypass connection in series with said load impedance or across said voltage source and in series with said load impedance.

5. The apparatus of claim 4 wherein said first and second sensors each comprise a tubular outer electrode and a longitudinally extending inner electrode spaced inward therefrom; said sensors are arranged serially substantially in alignment with one another; said conductor means include an electrically conductive connection between said inner electrodes of said first and second sensors, and electrically conductive connection between said outer electrodes of said first and second sensors, and first and second terminal conductors, said first terminal conductor being connected to said outer electrode of one said sensor and said second terminal being connected to said inner electrode of one said sensor; and one said terminal conductor is connected to one side of said load impedance and said other terminal conductor is connected through said switch to the other side of said load impedance.

6. The apparatus of claim 5 wherein said first and second terminal conductors comprise respectively first and second conductors of a lead cable.

7. The apparatus of claim 6 wherein said lead cable is a two-conductor coaxial cable and said first and second conductors are the center and outer conductors thereof.

8. The apparatus of claim 1 wherein said first and second sensors each comprise a tubular outer electrode and a longitudinally extending inner electrode spaced inward therefrom; said sensors are arranged serially substantially in alignment with one another; said conductor means include an electrically conductive connection between said inner electrodes of said first and second sensors, an electrically conductive connection between said outer electrodes of said first and second sensors, and first and second terminal conductors, said first terminal conductor being connected to said outer electrode of one said sensor and said second terminal being connected to said inner electrode of one said sensor; and one said terminal conductor is connected to one side of said load impedance and said other terminal conductor is connected to the other side of said load through said selective connecting means.

* * * * *